US008495197B1

(12) United States Patent
Nagargadde et al.

(10) Patent No.: US 8,495,197 B1
(45) Date of Patent: Jul. 23, 2013

(54) RESOURCE POOLING AND SUBLETTING FROM USER TO ANOTHER USER

(75) Inventors: Aparna Nagargadde, Herndon, VA (US); Kevin Christopher Miller, Herndon, VA (US)

(73) Assignee: Amazon Technologies, Inc., Reno, NV (US)

(*) Notice: Subject to any disclaimer, the term of this patent is extended or adjusted under 35 U.S.C. 154(b) by 133 days.

(21) Appl. No.: 13/248,291

(22) Filed: Sep. 29, 2011

(51) Int. Cl.
*G06F 15/173* (2006.01)

(52) U.S. Cl.
USPC ........... 709/223; 709/224; 709/225; 709/219; 709/229

(58) Field of Classification Search
USPC ................. 709/223, 224, 225, 219, 229, 226, 709/242; 455/426.1; 718/104; 398/25; 711/114
See application file for complete search history.

(56) References Cited

U.S. PATENT DOCUMENTS

| | | | |
|---|---|---|---|
| 2003/0224781 A1* | 12/2003 | Milford et al. ............. | 455/426.1 |
| 2009/0235265 A1* | 9/2009 | Dawson et al. ............... | 718/104 |
| 2009/0328036 A1* | 12/2009 | Betts-Lacroix ................... | 718/1 |
| 2010/0306379 A1* | 12/2010 | Ferris ............................. | 709/226 |
| 2011/0243553 A1* | 10/2011 | Russell .......................... | 398/25 |
| 2012/0054367 A1* | 3/2012 | Ramakrishnan et al. ...... | 709/242 |
| 2012/0124285 A1* | 5/2012 | Soran et al. ................... | 711/114 |

* cited by examiner

*Primary Examiner* — Le H Luu
(74) *Attorney, Agent, or Firm* — Novak Druce Connolly Bove + Quigg LLP

(57) ABSTRACT

Various electronic resources, such as multi-tenant or cloud resources, can be pooled together for access by specified members associated with a given pool. For example, users with access to different resources can enable their resources to be pooled together for purposes such as reduced pricing and increased flexibility. In some instances, a user can pool resources configured for a particular purpose, such that the user can effectively lease out an entire environment. The users accessing the pool can pay for some or all portion of the cost of the resources during the period of usage.

29 Claims, 6 Drawing Sheets

RESOURCE POOLING AND SUBLETTING FROM USER TO ANOTHER USER

BACKGROUND

As an increasing number of applications and services are being made available over networks such as the Internet, an increasing number of content, application, and/or service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In some environments, multiple users can share resources such as remote servers and data repositories, wherein the users can concurrently send multiple requests to be executed against the same set of resources. Since there typically is a limited amount of capacity for each type of resource, conventional systems enable users to obtain dedicated and/or reserved amounts of capacity for at least a specified period of time. Such approaches are expensive and often result in unused excess capacity, as the user typically must purchase enough resource capacity to handle periods of peak usage. In many cases, the user must still pay for this excess dedicated capacity. Certain systems enable a user to sell at least a portion of the resource capacity that has been provisioned for that user to one or more other users, but such an approach generally enables any appropriate users to obtain that capacity. These other users may not be known or trusted by the original user for whom the resources were provisioned, which can potentially expose those resources to misuse by an unknown user.

BRIEF DESCRIPTION OF THE DRAWINGS

Various embodiments in accordance with the present disclosure will be described with reference to the drawings, in which.

DETAILED DESCRIPTION

Figure 1:
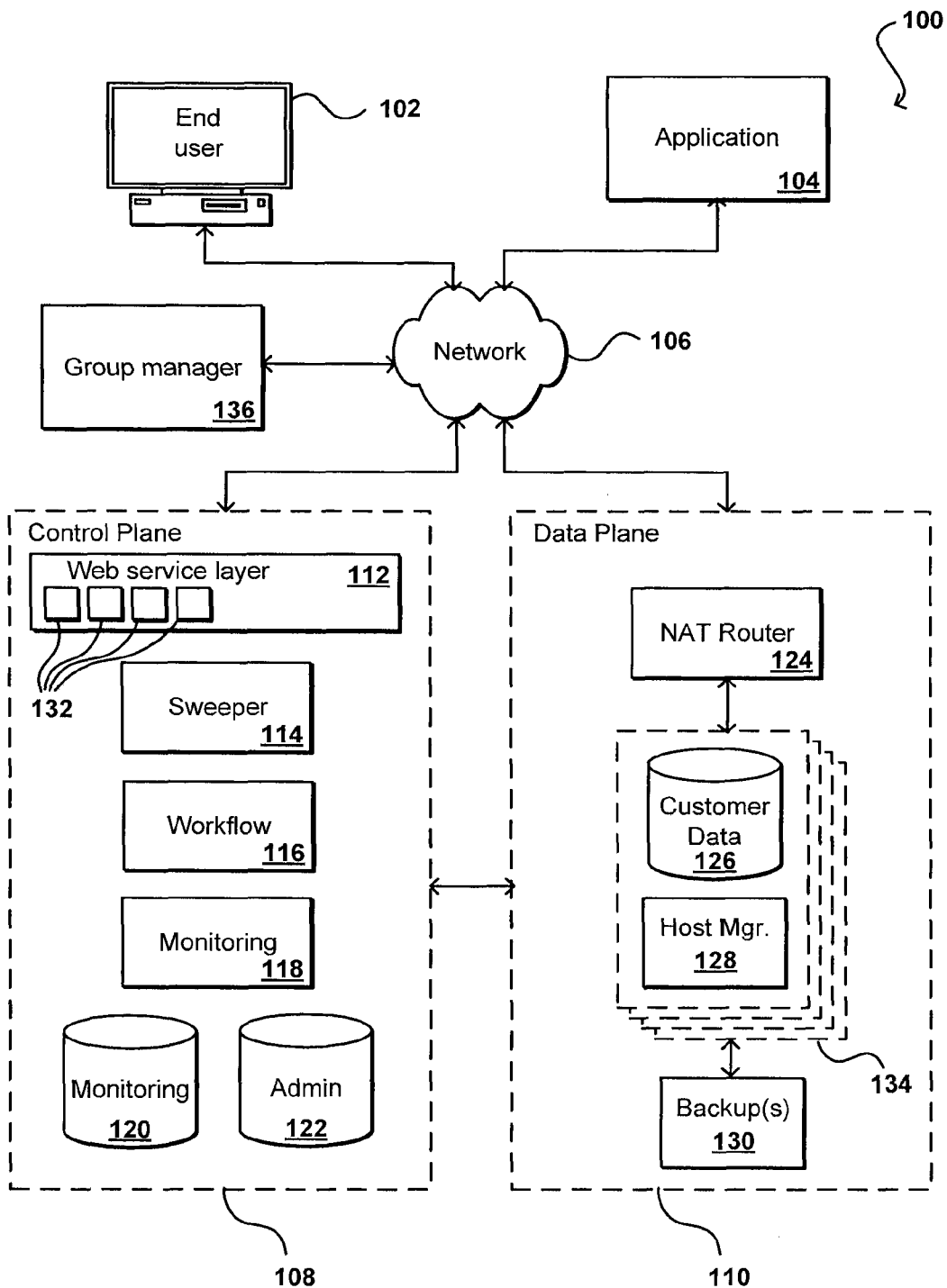
FIG. 1 illustrates an example environment in which various embodiments can be implemented.

Systems and methods in accordance with various embodiments of the present disclosure may overcome one or more of the aforementioned and other deficiencies experienced in conventional approaches to managing aspects of resource sharing and allocation in an electronic environment. In particular, various embodiments enable users to pool various electronic resources into a common pool that can be accessed and/or shared by a specified group or type of user. Electronic resources can be any appropriate resources, such as may be shared and/or multi-tenant resources, where at least a portion of those resources can be accessible to one or more parties other than a provider of those resources. These resources can include, for example, resources for processing, data storage, load balancing, database hosting, mapping services, parallel data processing, and various other services or systems that can manage an application environment or other such grouping or resources. For example, a pool of Web service resources can be shared among a group of members associated with a particular account or having at least one common criterion, or as are specified by at least one other member of the group. Such an approach provides at least some level of control to ensure that users accessing the resources in the pool are trusted by the members of a group associated with a given resource pool. Further, the members of the group can share in potential cost savings or other advantages of the pooling. For example, the group might get a lower rate based on the higher overall level of compute capacity, throughput, bandwidth, storage capacity, or other such aspects resulting from the pooling.

In at least one embodiment, users are able to specify one or more other users to join in a group having access to a resource pool. These users could be part of an established group or association, such as employees of a specified company or a particular type of user having similar credentials. In other instances, a user might add specific users, or might enable members of a social networking group, circle, or connection map to access a pool or resource capacity. For example, a user might specify a third party group management system that maintains information for a group of friends, connections, or other related users. The pool might then utilize this connection information to determine the members of a resource pool. In some cases a user might advertise or search for other users with specific resources or capacity that might benefit from pooling with a particular group. Various other selection mechanisms can be used as well as discussed and suggested elsewhere herein.

In some embodiments, users are billed for their respective allocations, but can have the ability to utilize at least some of the other capacity in the pool. In other embodiments, each member of the pool might be billed a proportional amount of the total combined charge. In still other embodiments, users of the group can be billed based on actual usage of a given resource. For example, a first user might have an amount of dedicated capacity of a given resource. If a second user uses that resource for half of a billing cycle, then the first and second users might split the cost for the first resource during that time. Proportional, fractional, or other such payment allocations can be determined based on a number of different factors.

In at least some embodiments, a person "subletting" an amount of resource capacity to other members of a group can determine an amount to be charged to those other members. For example, a user might not charge the full amount to the other members, in order to provide an incentive for those members to sublet the user's capacity while reducing the overall cost to that user. In some embodiments, those members might instead be charged extra as they are able to receive a dedicated resource for a shorter period of time than they might otherwise be required to commit, with a portion of the cost going to the leasing user and a portion going to the provider, or some other such arrangement.

In at least some embodiments, the pooling of resources can further be advantageous as the greater amount of dedicated capacity can potentially result in a lower price per unit of capacity. For example, a provider might have a tiered pricing structure wherein the cost per unit of capacity decreases with set increases in the amount of reserved or dedicated capacity. By pooling resources with other group members, a user might be able to lower the cost for the same amount of dedicated capacity over a given period of time than if the user had not included that resource in a pool.

Various other functions and advantages are described and suggested below as may be provided in accordance with the various embodiments.

FIG. 1 illustrates an example of an environment 100 that can be used to provide users with access to one or more shared and/or multi-tenant resources in accordance with various embodiments. In this example, a computing device 102 for an end user is shown to be able to make calls through at least one electronic network 106 (e.g., a local area network, cellular network, or the Internet) to be able to perform tasks such as to provision data repositories, request dedicated computing capacity, utilize data instances, or otherwise submit requests relating to one or more resources. In this particular example the provider environment is divided into two logical areas, a control plane 108 and a data plane 110. It should be understood, however, that various other environments and configurations can be used as well to implement aspects of the various embodiments. In this example environment, an end user computing device 102 or application 104 can submit management, configuration, or other such requests to the control plane 108, which can manage tasks such as provisioning instances and managing access rights. In at least some embodiments, computing, data, and other such resources reside in the data plane 110, such that one a user has access to a resource the user can submit requests directly to the data plane 110 without having to go through the control plane 108. While an end user computing device and application are used for purposes of explanation, it should be understood that any appropriate user, application, service, device, component, or resource can access the interface(s) of the control plane and/ or data plane as appropriate in the various embodiments. Further, while the components are separated into control and data "planes," it should be understood that this can refer to an actual or virtual separation of at least some resources (e.g., hardware and/or software) used to provide the respective functionality.

As mentioned, the control plane 108 is essentially a virtual layer of hardware and software components that handles control and management actions, such as provisioning, scaling, replication, etc. The control plane in this embodiment includes a Web services layer 112, or tier, which can include at least one Web server, for example, along with computer-executable software, application servers, and/or other such components. The Web services layer can include a set of application programming interfaces (APIs) 132 (or other such interfaces) for receiving Web service calls or other such requests from across the network 106. Each API can be provided to receive requests for at least one specific action to be performed with respect to the data environment, such as to provision, reserve, scale, clone, or hibernate an instance of a resource. Upon receiving a request to one of the APIs, the Web services layer can parse or otherwise analyze the request to determine the steps or actions needed to act on or process the call. For example, a Web service call might be received that includes a request to create a data repository within a dedicated capacity for the user. In this example, the Web services layer can parse the request to determine the type of data repository to be created, the storage volume requested, the amount of available capacity for the user, the type of hardware requested (if any), or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs 132 and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store 122, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a geographical region, or near a geographical location, for example, such that the servers are resilient to single data center failures.

The control plane in this embodiment includes what is referred to herein as a "sweeper" component 114. A sweeper component can be any appropriate component operable to poll various components of the control plane or otherwise determine any tasks to be executed in response to an outstanding request. In this example, the Web services layer might place instructions or information for the "create database" request in the admin data store 122, or a similar job queue, and the sweeper 114 can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 116 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

An example "create database" workflow for a customer might includes tasks such as ensuring the proper set of launch configuration parameters is specified for the request, provisioning a data store instance utilizing a set of launch configuration parameters, allocating a volume of off-instance persistent storage, attaching the persistent storage volume to the data store instance, then allocating and attaching a DNS address or other address, port, interface, or identifier which the customer can use to access or otherwise connect to the data instance. In this example, a client device 102 is provided with the DNS address and a port address to be used to access the instance. The workflow component can manage the execution of these and any related tasks, or any other appropriate combination of such tasks, and can generate a response to the request indicating the creation of a "database" in response to the "create database" request, which actually corresponds to a data store instance in the data plane 110, and provide the DNS address to be used to access the instance. A user then can access the data store instance directly using the DNS address and port, without having to access or go through the control plane 108. Various other workflow templates can be used to perform similar jobs, such as deleting, creating, or modifying one of more data store instances, such as to increase storage.

The control plane 108 in this embodiment also includes at least one monitoring component 118. When a data instance is created in the data plane, information for the instance can be written to a data store in the control plane, such as a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component can also perform other tasks, such as monitoring of usage of various resources for use in enforcing usage limits and billing for resource usage. A monitoring component can also perform other tasks, such as to monitor the health of all the running repositories, servers, instances, or other resources for the control plane, detect the failure of any of these resources, and initiate the appropriate recovery process(es).

In at least some embodiments, a resource instance 134 can include appropriate components, such as may include at least one data store 126 and a host manager component 128 for the machine providing access to the resource. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository.

The monitoring component 118 can communicate periodically with each host manager 128 for monitored resource instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, the monitoring component can determine that there is a problem and can store information in the Admin data store 122 or another such job queue to perform an action for the instance, such as to verify the problem and re-provision the instance if necessary.

As discussed, once an instance is provisioned and a user is provided with a DNS address or other address or location, the user can send requests "directly" to the data plane 110 through the network 106, using a Java Database Connectivity (JDBC) or other such client, to directly interact with that instance 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a client device 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. Each instance 134 can also have at least one backup instance or copy in persistent storage 130. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110. As discussed later herein, such an environment can also include at least one third party group manager 136 that can be specified by a user 102 for purposes of determining membership of at least one resource pool.

Figure 2:
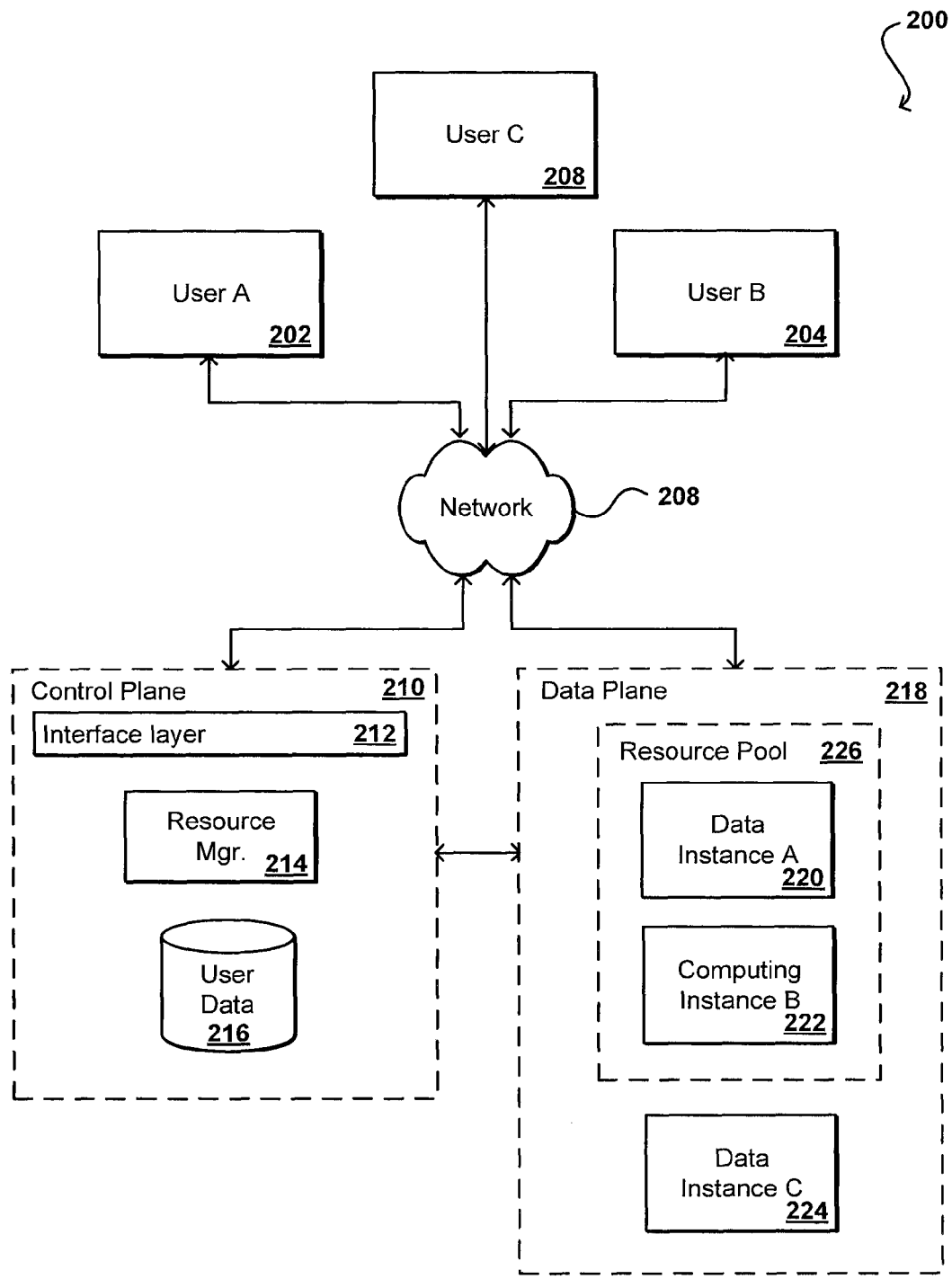
FIG. 2 illustrates components for pooling shared resources in accordance with one embodiment.

FIG. 2 illustrates a simplified example environment 200 wherein three users (User A 202, User B 204, and User C 204) each have access to one or more shared resources offered by at least one provider. In this example, User A 202 has dedicated access to the capacity of Data Instance A 220, User B 204 has dedicated access to Computing Instance B 222, and User C 206 has access to Data Instance C 224. It should be understood that each user can have access to one or more types of resource, and can also provision multiple instances of a type of resource within the scope of the various embodiments.

As mentioned above, User A 202 might want to be able to sub-let use of Data Instance A 220 when not in use by User A. User A might also want some control over who is able to obtain that access. In this example, User A might want to allow User B 204 to be able to sub-lease Data Instance A 220. User B might be selected for any of a number of reasons, such as being a co-worker or friend of User A, being part of a social networking group, etc. In addition, User A might want the ability to access Computing Instance B 222, to which User B has dedicated access rights. In this example, User A 202 (or User B 204) can send a request over at least one network 208 that is received by an API or other such interface of an interface layer 212 of a control plane 210 (or other provider environment). The request sent by User A 202 can include a request to add User B 204 as an authorized member of a resource sharing pool or group, add User B to an existing account, or perform another such action whereby User A and User B are associated using one or more appropriate indicia. A resource manager 214 or similar component can analyze the information in the request, along with access rights for Data Instance A, and determine whether to enable User B to be added to the group. Considerations can include, for example, the type of security or level of trust associated with User B, a pricing level paid by User B, a user type of User B, etc. If it is determined that User B can be added to the group including User A for access to at least Data Instance A 220, then an appropriate indicia (e.g., a user ID in a group data table) can be stored to an appropriate location, such as a user data store 216.

In at least some embodiments, a notification can be sent to User B 204 upon User A submitting the request and/or approval of User B being added to the group. In at least some embodiments, User B must confirm the action before being added to the group. Further, User B in at least some embodiments can indicate whether resources for which User B has dedicated access rights should be included in the pool 226 for the group. For example, User B might want to share access to Data Instance A 220 with User A 202, but might not want to grant User A access to sub-lease Computing Instance B 222. In some embodiments, approval to join a group causes any associated resources to automatically be added to an associated pool. In either case, or in other such scenarios, the user having dedicated, reserved, or other access to a type of resource can configure various aspects of the sharing, such as a limit on the type or amount of use, a pricing for usage of the resource, etc. In at least some embodiments, the user can specify this information by submitting an appropriate request to an API or similar interface of the control plane 210. Upon Computing Instance B 222 being added to the pool 226, appropriate information can again be stored in (or at least accessible by) the control plane 210, such as by storing one or more resource identifiers to the user data store 216 or another such location.

In this example, User A 202 can access Data Instance A 220 at any time (unless in use by another user) because User A has dedicated access to that instance. Because Computing Instance B 222 is in the pool 226 for the group, User A can also obtain access to Computing Instance B if User B 204, who has obtained dedicated access to that instance from the provider, is not using Computing Instance B. User B 204 is in a similar situation, as User B can access Computing Instance B 222 at any time due to dedicated access, and can access Data Instance A 220 when not in use by User A 202. User C 206, who is not in the group, cannot access Data Instance A 220 or Computing Instance B 222. Similarly, Users A and B cannot access Data Instance C unless granted access by 224 as part of a separate group, spot market, etc.

Through such an approach, users of multi-tenant shared resources, cloud services, or other such objects can sub-let or provide sub-access to various resources to specific users, accounts, entities, or other such parties in ways that ensure access to be restricted to parties trusted by the users having access or rights to those resources. In at least some embodiments, one or more specific interfaces can be utilized to enable the establishing of resource pools, management of pooled resources, adjustment of group members, and other such actions. The interfaces can be used to perform other actions as well, such as to enable multiple users to negotiate or bid on how various resources are shared.

In one example, an API can be added that enables specific user identifiers or personalities to be attached to specific resources, such as reserved instances or capacity in specified regions. Another API can be utilized that enables users to reclaim certain resources from the pool, at least for a certain period of time. Another API can be used to allow users to determine and/or claim a portion of the currently available resources in a designated pool to which those users belong. Other APIs can enable a user to create the resource pool, add or remove resources from the pool, and add or remove users from the pool. Various other APIs can be utilized as well within the scope of the various embodiments as should be apparent to one of ordinary skill in the art in light of the present disclosure.

In some embodiments, a user might configure a set of resources that can be shared together. For example, a user might setup a testing environment that includes an amount of processing and storage capacity, and amount of bandwidth and throughput, and other such aspects. The user can designate this as a pool, or a single resource within a pool, that can be sub-let to another user in a group. In this way, a user can potentially lease out entire environments.

For example, the user might utilize a testing environment when there is an upcoming product release, but might not utilize that environment at the beginning of a development cycle. There might be other users, however, who would appreciate the ability to utilize the testing environment during times of inactivity such that these other users do not have to separately obtain and configure the necessary resources, particularly when there is a limited time in which the testing environment is needed. Further, using dedicated resources can save money as dedicated capacity can be cheaper per unit of capacity than non-dedicated resources, and a party can in this case sub-lease at least a portion of a user's dedicated capacity.

In some embodiments, there can be multiple users sharing multiple types of resources in a given pool. Such an approach enables any trusted member of a group to be able to access any of those types of resources, such as reserved instances, block storage volumes, relational database instances, and the like, without having to separately obtain and configure those resources. A member of the group can instead obtain access through the pool and, in many cases, start using the resource right away.

In one embodiment, a member of a group obtaining access to at least one pooled resource can have an identifier or other indicia attached to, or specified for, that pooled resource. When a subsequent request for that resource is received, the request can be analyzed to determine whether the member's credentials are attached to the target resource or whether the member otherwise has access to that resource. If, for example, a first user creates a virtual private cloud environment with specific characteristics, a member of that user's group could submit a request to sub-lease the private cloud environment for a period of time. An identifier for that user could be attached to the cloud environment and/or each resource making up that environment. The member then can connect to any of the resources in the environment to which the user has been granted access. At the end of the prescribed period of time, control of the bundle of resources for the private cloud environment can revert to the original user having dedicated access to those resources.

As mentioned, access to these environments can be restricted to specific users in order to prevent unauthorized access to, or modification of, the environments. An "owner" of an environment might utilize internal reserved pricing or enable bidding among the group for use of the environment, but the bidders or purchasers can correspond to trusted sources. Methods for enabling users to access resources using a bidding or spot market approach are well known in the art and will not be discussed herein. In the various embodiments, however, the bidding can relate to pooled resources and/or can be limited to members of a group, such as members of a social networking group.

Figure 3:
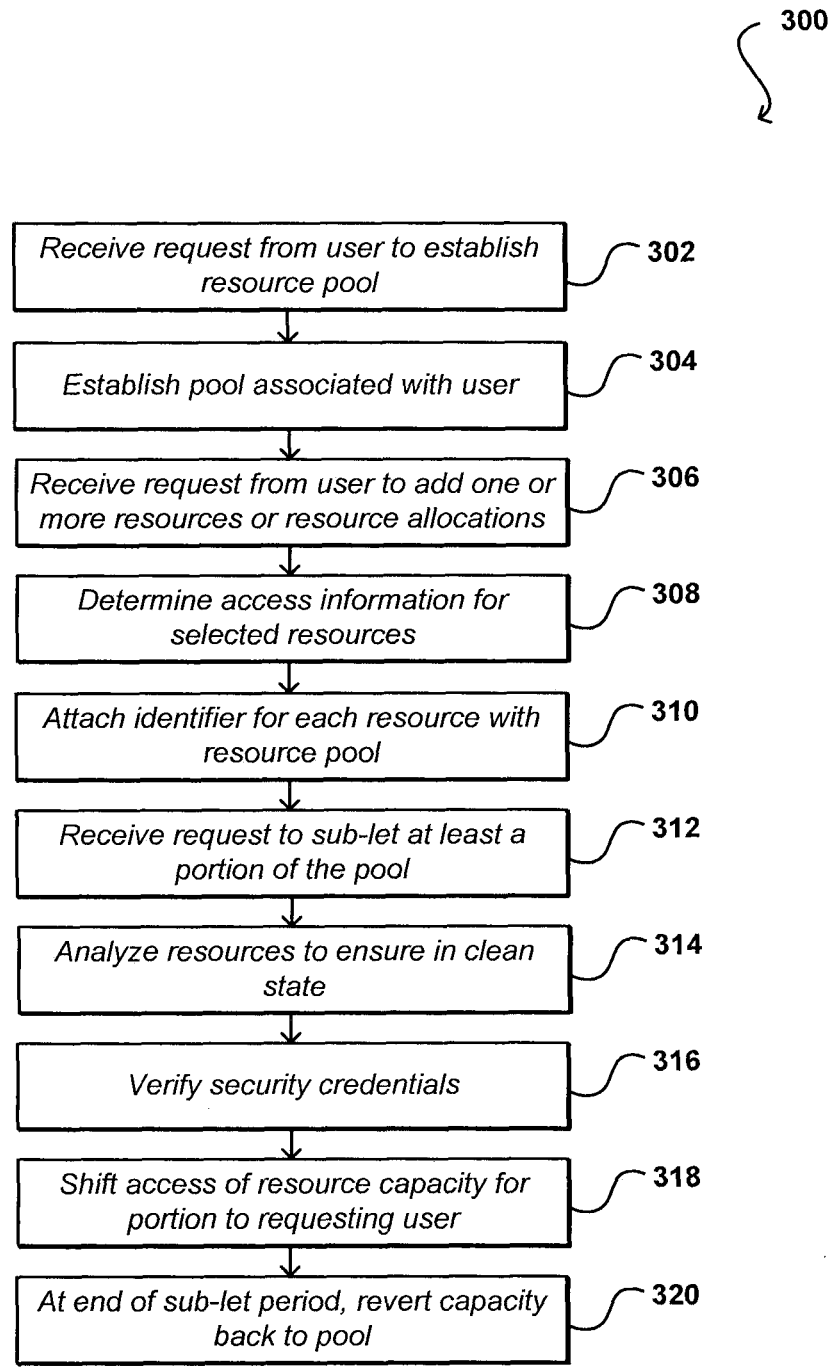
FIG. 3 illustrates an example process for creating and accessing a resource pool in accordance with one embodiment.

FIG. 3 illustrates an example process 300 for creating a resource pool that can be utilized in accordance with various embodiments. It should be understood for this and other processes disclosed herein that there can be additional, fewer, or alternative steps performed in similar or alternative orders, or in parallel, within the scope of the various embodiments unless otherwise stated. In this example, a request is received 302 from a user to establish a resource pool. In response, a pool can be established 304 and an appropriate interface (e.g., an API or GUI) generated that enables at least the user requesting the resource pool to provision various aspects of the pool. At least one subsequent request is received 306 from the user selecting one or more resources and/or allocations to be assigned to the pool. These resources can be any appropriate resources, such as computing instances, data volumes, and the like. Access information for the selected resource(s) can be determined 308, such as by a management component of a control plane, and if the resource(s) are able to be added to the pool then an appropriate identifier can be generated, attached, and/or stored 310 that will link the resource to the pool. As discussed elsewhere herein, membership information for a group can be obtained from the user, or from a separate party or entity specified by the user. Once the pool of resources is established, a request can be received 312 to rent or sub-let a portion or the entire pool of resources to a third party. The request can specify any appropriate information, such as a beginning and end time of access, an identifier for the third party, and other such information.

At or near the beginning of the time period, a number of verification, scrubbing, or other such processes can be undertaken. For example, the resources to be sub-let can be analyzed 314 to ensure that those resources are in what is referred to herein as a "clean" state. A resource in a clean state can appear to the user as a resource that has not been used previously, in that the resource can have default configuration information and will have no data stored for other users. Such an approach is preferable to the leasing customer, and desirable for any previous user who wants their data to be protected from access by subsequent users. Another process can verify 316 that the potential user's security credentials, and in at least some embodiments can insert those credentials into those resources for purposes of authentication. If the credentials are verified and the resources scrubbed, for example, access rights to (or temporary "ownership" of) the resources can be shifted 318, such as by attaching a new user identifier to those resources, whereby the third party is able to view and/or manipulate those resources. At the end of the period, control can revert 320 back to the original user and/or capacity can again be available to the resource pool.

In at least some embodiments, multiple pools can be created from the same set of resources. Each of these pools can potentially have a different grouping or selection, with potential for overlap, which can allow for multiple environments or other combinations that can be rented out separately as appropriate. In some cases, a pool might put a lock on resources of that pool while in use, such that no other conflicting pool can obtain access to those resources during that time. In at least some embodiments, any resources that can logically be mapped together can comprise a pool. A pool in some embodiments can also include the users able to access those resources, or the pool can be linked with at least one group having the ability to share access to those resources. In some embodiments, a set of instances can be included in multiple pools with various levels of priority to grant access to users of the various pools. A user might want an entire set of reserved instances to be given first priority to members of a particular group, then with a second level of priority to members of another group. In some instances, a member wanting access to an entire pool for a lease period might be given priority over a user wanting access to only a portion of that pool. Various other priority schemes can be used as well within the scope of the various embodiments. A component such as a management module or control plane can manage the assigning, locking, granting, and other such aspects for the various groups and members. In some embodiments, a control plane component can also generate customized pools as needed or requested by certain members, based at least in part upon the available resources in the overall pool for the group.

A member of the group or other specific user can gain access to a resource pool in any of a number of different ways. In some embodiments, a user can utilize an API to contact the owner of the resource for access. Upon obtaining access, that user can receive a token for use in acquiring the resources. Alternatively, the user can specify a set of other users and how those other users are authorized to access the resources. Those other users then can be able to automatically gain access to those resources while not being used without obtaining access from the owner of those resources. An owner also can specify when certain resources are available, or can select or specify rules by which users can obtain access to a particular pool of resources. For example, a user might only be able to reserve access for so many hours in a month, at certain times of day or days of the week, etc.

In some embodiments, a provider might enable multiple users to be assigned to a common account. For example, each member of an organization might be associated with a single account number. Using such an approach, the account number can be associated with a pool of resources, such that anyone associated with the account can access the resources (unless otherwise limited by roles, business rules, etc.). Such an approach can potentially simplify pool management, as members associated with an account number will likely already be managed by another module, such as an account management module, and the resource manager can in at least some instances leverage this existing information to determine whether a user is associated with an account. In some embodiments, only certain members associated with an account can obtain access to a pool of resources, but everyone with access will be associated with that account. In some embodiments this can simplify billing as well, as a single monthly bill, for example, can be sent to an address or entity associated with the account.

Figure 4:
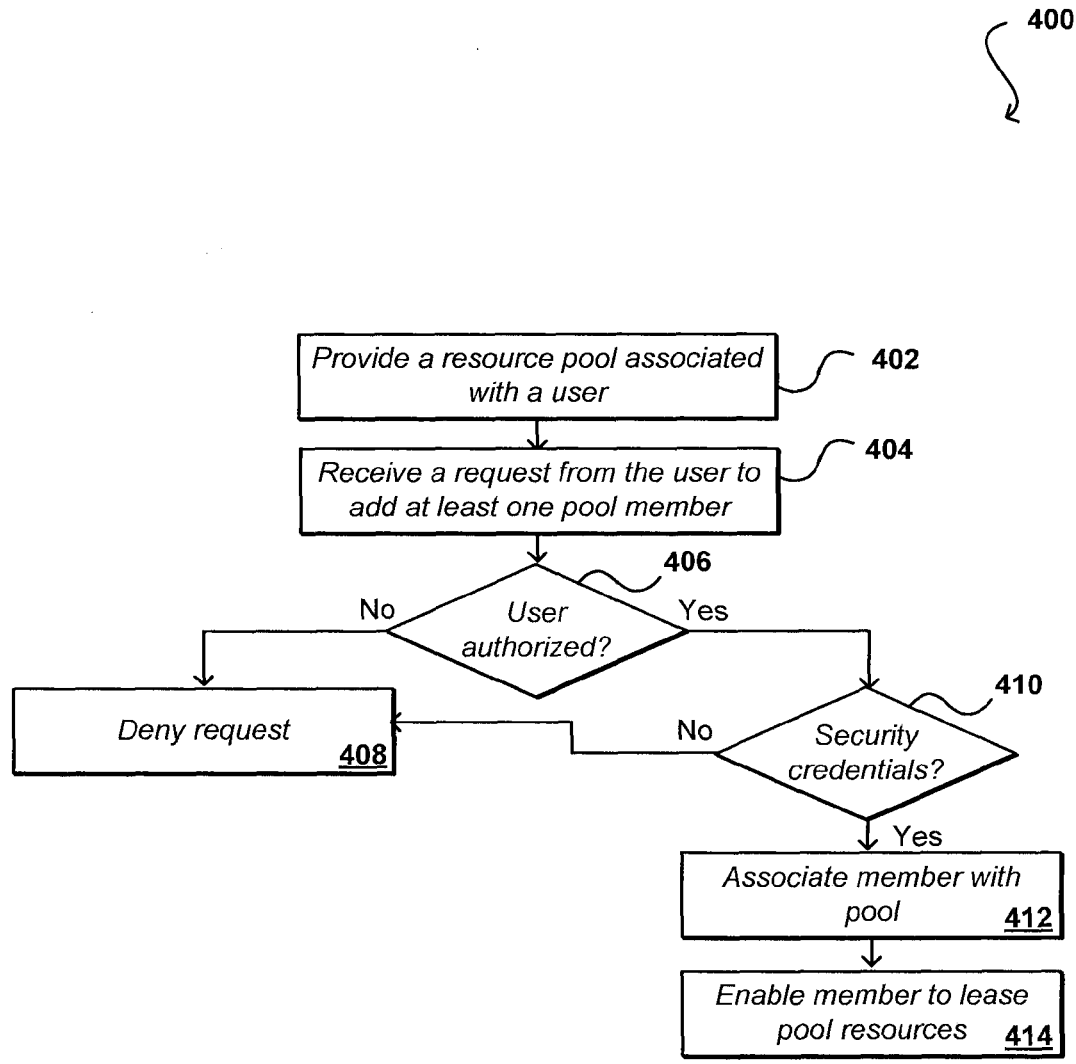
FIG. 4 illustrates an example process for associating members with a resource pool in accordance with one embodiment.

FIG. 4 illustrates an example process 400 for adding members to a resource pool that can be utilized in accordance with various embodiments. In this example, a user creates or is otherwise provided 402 with access to at least one pool for a set of resources to be shared among multiple users, such as is described above with respect to FIG. 3. The user typically will have dedicated, reserved, or some other level of access to one or more resources of one or more types, and for purposes of this example will be referred to as an "owner" of the pool, although it should be understood that the resources typically will be owned and operated by another party, such as a cloud provider. A request can be received 404 from the owner of a pool to add at least one other user as a member of the pool. The owner can, through an API or GUI, for example, specify one or more users to be added as members of at least one of the pools, such as by associating an identifier for each of those users with an identifier for the respective pool. A determination can be made 406 as to whether the owner has permissions or access rights to add a member to the pool of resources, either overall or to any individual resource in the pool. If the owner does not have such authority, the request can be denied 408. If the owner is authorized to add members, a determination can be made 410 as to whether the specified user to be added has sufficient security credentials, again either overall or to any individual resource in the pool. If the specified user does not have sufficient credentials, the request can be denied. If the specified user does have sufficient credentials, the user can be associated 412 as a member of the pool and enabled 414 to lease at least a portion of the pool resources for at least a specified period of time. If the member has resources that can potentially be added to the pool, a request might be sent to the member user to ask whether the member would like at least some of those resources to be added to at least one pool. If the member allows the resources to be added, any member of the pool then can be enabled to access any or all of those resources when not in use by another member of the pool.

Figure 5:
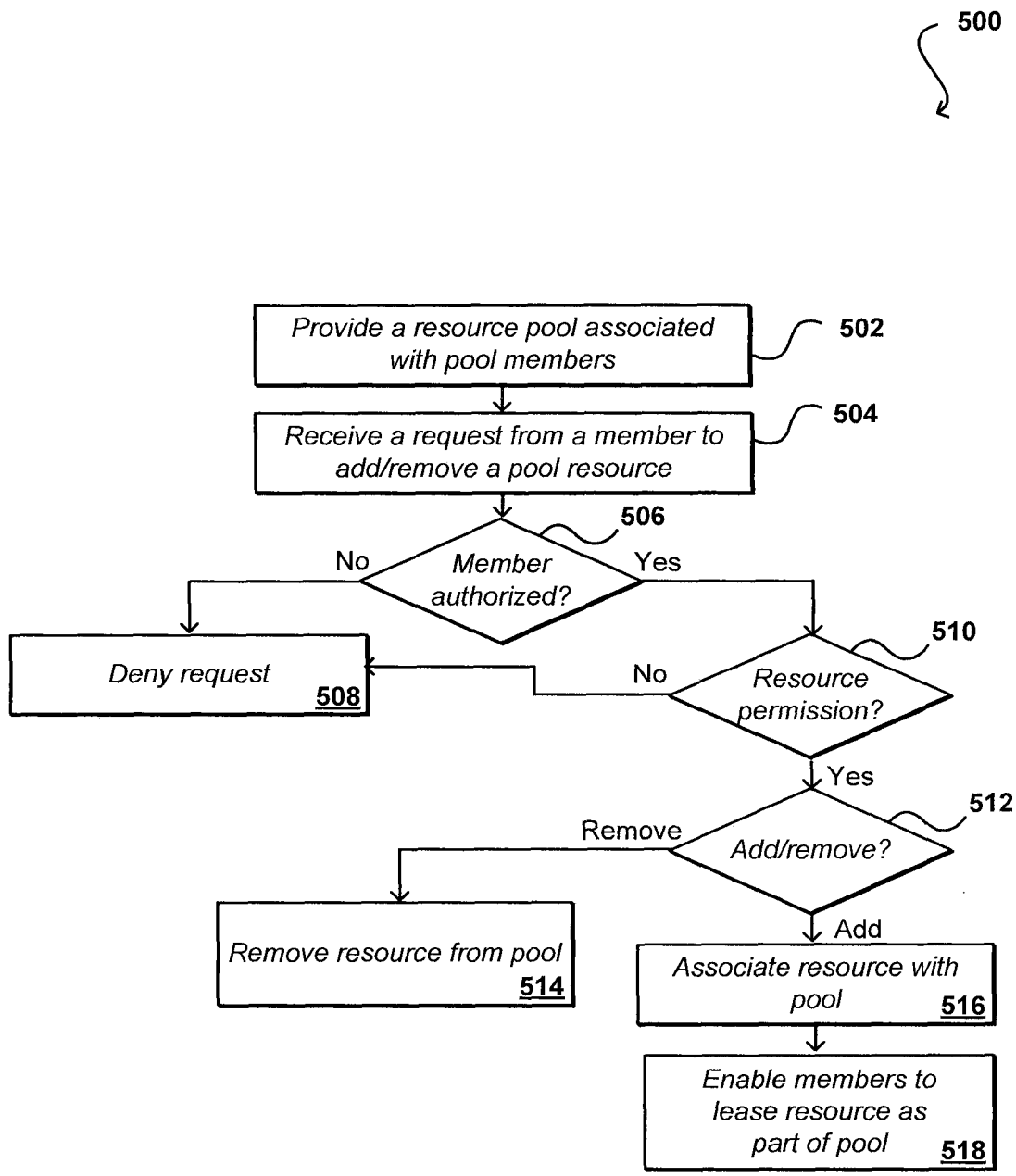
FIG. 5 illustrates an example process for updating resources associated with a resource pool in accordance with one embodiment.

FIG. 5 illustrates an example process 500 that can be used to add or remove resources with respect to a resource pool in accordance with various embodiments. In this example, a resource pool is provided 502 that is able to be accessed by associated members of the pool. If a request is received 504 from a member to add or remove a resource from the pool, a determination can be made 506 as to whether that member is authorized to add or remove resources with respect to the pool. If the member is not authorized, the request can be denied 508. If the user is authorized, a determination can be made 510 as to whether the user has the appropriate permissions needed to add, remove, modify, or access the resource to be added or removed. If not, the request can be denied. If the member has the appropriate permissions and the request is determined 512 to be a "remove" request, the resource can be removed and "ownership" can revert back to that member. If the member has the appropriate permissions and the request is determined 512 to be an "add" request, the resource can be associated 516 with the pool and the members of the pool can be enabled 518 to lease the resource for a period of time as part of the pool. Various other approaches to adding and removing users and resources, as well as adjusting configuration or access parameters, among other such values, can be utilized as well within the scope of the various embodiments.

Figure 6:
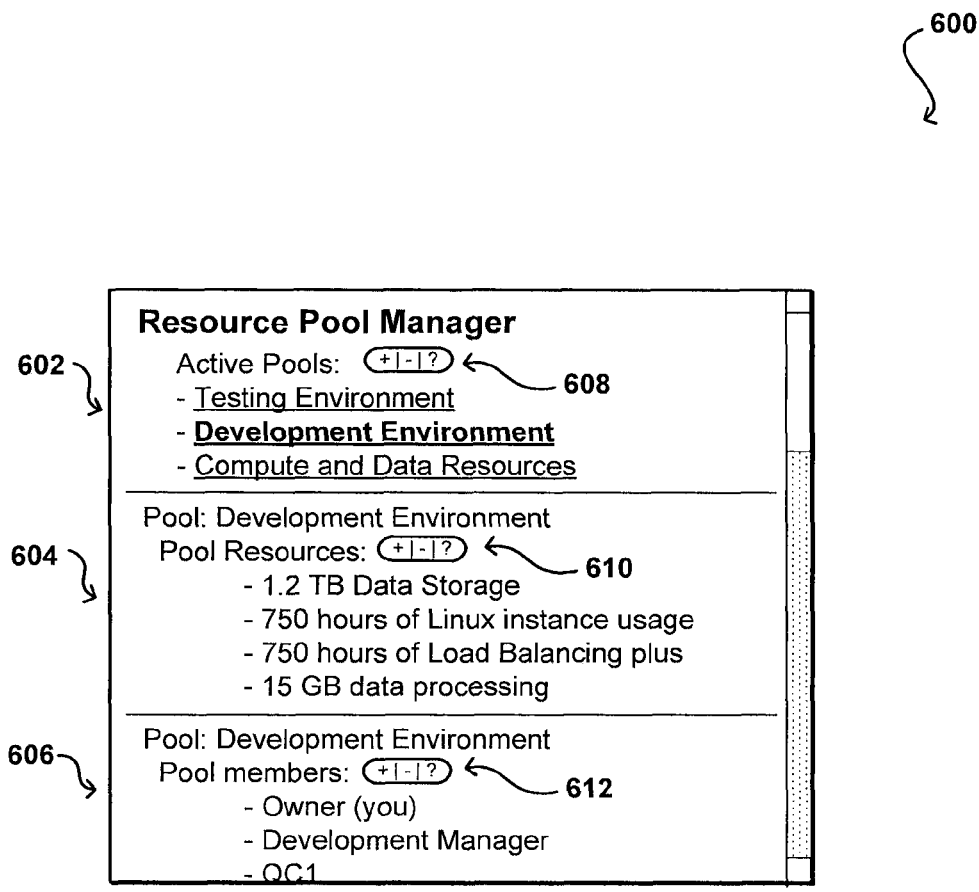
FIG. 6 illustrates an example interface for managing a resource pool that can be used in accordance with one embodiment.

FIG. 6 illustrates an example of a pool management interface 600 that can enable a user to manage various aspects of one or more resource pools in accordance with various embodiments. As discussed, a user can alternatively update information using at least one API or similar interface, instead of a GUI as illustrated. In this example interface 600, information associated with a user accessing the pool management interface is displayed. In a first section 602, the use is able to view various resource pools associated with that user. The user is able to select one of these pools, such as by selecting a link associated with that pool. Various types of information can be displayed for the selected pool. For example, a list of resources 604 included in the pool can be displayed, as well as a list of members 606 of the pool able to access those resources. Various other information can be displayed as well as should be apparent in light of the present disclosure, such as may include billing information, historical usage data, access restrictions, and the like. The user can also manage various aspects of the pools from such an interface. For example, there can be one or more user selectable options 608 enabling a user to add or remove pools associated with that user, as well as options 610, 612 to add or remove resources from a selected pool. Various other options can be utilized as well within the scope of the various embodiments.

For example, in at least some embodiments an owner can grant priorities to various users and/or pools. In one example, a first user might be willing to pay more for a certain type of access, might be a more frequent user of the resources, etc. For any such reason, an owner might choose to grant this user higher priority to access the resources than other users. Similarly, a user might not use certain types of resources as often, or might bundle certain resources to be used together, such that a user might grant a higher priority to requests for certain resources or pools than for other types of request. Various rules or priority criteria can be established among the various embodiments.

As discussed, various payment options can also be specified, such as may be set by the provider, the owner of a pool or resource, a bidding user, or any other appropriate party. In some embodiments a user can specify information through an interface such as that illustrated in FIG. 6. In some embodiments a user might specify various bidding criteria that are used to automatically submit bids for resources when needed. Along with payment options, there can also be various time period negotiations, such as where a bidder wants access for a certain period of time but the owner does not want those resources tied up for that length of time. Various approaches to negotiating access to a resource can be applied to pooling as should be apparent in light of the present disclosure.

As mentioned, the pricing for resources in at least some embodiments can be based at least in part upon the amount or level of reserved capacity. Users thus can be enticed to pool resources in order to obtain a different tiered pricing level based on the aggregated capacity. Such an arrangement can potentially also be beneficial to the provider, as the provider might not have to provide as much physical capacity, as ten users needed 10 units of capacity at peak load can potentially share a set of resources of 10 units of capacity, instead of each leasing 10 units of capacity. In at least some embodiments, a user can utilize an API to add or remove resources from the pool if additional capacity is needed, such as where the user no longer wants to share a resource where the user is not getting enough capacity from that shared resource. In some embodiments, a user can add a resource to a pool using a non-guaranteed approach, whereby a member of the pool can sub-let that resource when not in use at a lower price, but the owner of that resource can pull the resource back at any time.

There also can be different types of access granting as well. For example, in some embodiments an owner of a pool or resource must manually grant access to each request from a user to access a pool or resource. In other embodiments, one or more rules can be specified that enable users to automatically grant access to one or more pools and/or resources. The rules could take into account any of a number of different factors, such as a type of user, a length of time needed for access, a pricing level, and other such information. Such an approach can be beneficial where a user wants access to an entire pool which includes resources from multiple resource owners, but the user does not want to wait to get manual approval from each of those resource owners, and potentially a pool manager as well. If there are different access criteria or limits for at least some of these resources, the automatic approval process can ensure that all of these are met as well. For example, a dynamic address might have a maximum duration in which it can be used, and a database might be limited by the size of the instance hosting the database and the maximum number of available connections, etc. Various usage limits can be applied as well, such as prohibiting a user from increasing the size of a data instance or performing certain alterations of the resources. In other embodiments, various modifications can be made which will then revert when the user is done accessing the resources. Any of a number of different rules or limits can be utilized as well within the scope of the various embodiments.

As will be appreciated, although a Web-based environment is often used herein for purposes of explanation, different environments may be used, as appropriate, to implement various embodiments. For example, a user can utilize a client device that can include any appropriate device operable to send and receive requests, messages, or information over an appropriate network and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In one example, the network includes the Internet, as the environment includes a Web server for receiving requests and serving content in response thereto, although for other networks an alternative device serving a similar purpose could be used as would be apparent to one of ordinary skill in the art. The illustrative environment also includes at least one application server and data store. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing access to a computing environment, comprising:
   under control of one or more computer systems configured with executable instructions,
   enabling a first user to obtain an amount of dedicated capacity of each of a plurality of types of electronic resource for at least a period of time from an electronic resource provider;
   enabling the first user to create a resource pool including the amount of dedicated capacity of each of the plurality of types of electronic resource;
   enabling the first user to specify a set of configuration parameters for the plurality of types of electronic resource to create a computing environment for supporting at least one type of computing operation; and
   enabling the first user to sub-let the resource pool to a specified user for a lease period,
   wherein the specified user is able to obtain dedicated access to the computing environment for the lease period without having to separately obtain access to the plurality of types of resource and specify the set of configuration parameters to create the computing environment, and
   wherein control over the computing environment reverts to the resource pool at an end of the lease period.

2. The computer-implemented method of claim 1, wherein the specified user pays an amount for the lease period that is in excess of the cost for the amount of dedicated capacity.

3. The computer-implemented method of claim 1, wherein control of the computing environment reverts back to the first user after the lease period.

4. The computer-implemented method of claim 1, wherein the first user is able to create additional resource pools including different subsets of the dedicated capacity of the plurality of types of electronic resource, each additional resource pool being able to be concurrent sub-let to different users depending upon an availability of overlapping resources between the additional resource pools.

5. The computer-implemented method of claim 1, wherein the dedicated capacity of at least one type of electronic resource includes at least one of computing capacity, storage capacity, bandwidth, load balancing, parallel data processing, or application environment management.

6. The computer-implemented method of claim 1, wherein the computing environment further includes at least one of a set of access control lists, a set of credentials, and resource management services.

7. A computer-implemented method of managing electronic resources offered by a resource provider, comprising:
   under control of one or more computer systems configured with executable instructions,
   creating a pool of the electronic resources including an amount of dedicated capacity of the at least one type of electronic resource, access to the dedicated capacity of the at least one type of electronic resource having been granted to one or more users;
   associating at least the one or more users with the pool of electronic resources as one or more members of the pool;
   enabling each member of the pool to request at least a portion of the dedicated capacity of the at least one type of electronic resource in the pool when the portion is not being utilized by another member of the pool;
   when a request is received from a member to access at least a portion of the dedicated capacity:
   verifying that the portion is available;
   ensuring that the portion of the dedicated capacity for the at least one type of electronic resource is in a clean state;
   ensuring that at least one security control is in a determined state to ensure an amount of access to the portion of the dedicated capacity; and
   granting the member access to the portion of the dedicated capacity when the portion is available and in a clean state, and the at least one security control is in a determined state,
   wherein each member is able to utilize up to the dedicated capacity of the pool when available without having to separately obtain dedicated capacity for each type of electronic resource needed for a task for the member.

8. The computer-implemented method of claim 7, wherein an electronic resource is in a clean state when a configuration of the electronic resource is in a default state and when there is no data stored in the electronic resource for another user.

9. The computer-implemented method of claim 7, further comprising:

causing each member utilizing at least a portion of the dedicated capacity to be charged an amount corresponding to the utilizing.

10. The computer-implemented method of claim 9, wherein each member is further charged a portion of the cost for an overall amount of the dedicated capacity of the pool.

11. The computer-implemented method of claim 7, wherein each member requesting usage of a portion of the dedicated capacity is able to submit one or more bids for the portion for a period of time, the one or more bids being used to determine the member having access to the portion of the dedicated capacity during the period of time.

12. The computer-implemented method of claim 7, wherein each member having dedicated access to a resource that is added to the pool is charged for the resource when not being utilized by another member of the pool.

13. A computer-implemented method of managing electronic resources, comprising:
   under control of one or more computer systems configured with executable instructions,
      enabling a user to obtain an amount of dedicated capacity of a set of electronic resources for at least a period of time from a provider, the set of electronic resources capable of providing capacity in excess of the amount of dedicated capacity for use by at least one other user;
      enabling the user to create a resource pool by specifying (i) a portion of the amount of dedicated capacity and (ii) one or more members of the resource pool to have access to the portion of the dedicated capacity of the resource pool; and
      in response to receiving a request for access to at least a portion of the amount of dedicated capacity for a leasing period of time from a member of the resource pool:
         validating the member as a member of the resource pool;
         determining an availability of the requested portion of the dedicated capacity during the requested leasing period;
         ensuring that the requested portion is in a clean state;
         ensuring that at least one security control is in a determined state to ensure an amount of access to the requested portion; and
         granting the member with exclusive access to the requested portion of the dedicated capacity during the requested leasing period when the member is validated, the requested portion is in a clean state, the at least one security control is in a determined state, and the requested portion is available during the requested leasing period.

14. The computer-implemented method of claim 13, further comprising:
   causing control of the requested portion to revert back to the user after the requested leasing period.

15. The computer-implemented method of claim 13, wherein the one or more members have additional dedicated capacity of at least one type of resource, and further comprising:
   enabling the user to add at least a portion of the additional dedicated capacity to the resource pool, each member further able to obtain access to the additional dedicated capacity.

16. The computer-implemented method of claim 15, further comprising:
   enabling the user to add at least a portion of the dedicated capacity and additional dedicated capacity to at least one additional resource pool.

17. The computer-implemented method of claim 13, wherein the user is able to specify different members of each additional resource pool, each additional pool capable of sharing at least one resource with another additional pool.

18. The computer-implemented method of claim 13, wherein the at least one type of electronic resource includes one or more electronic resources offered from one or more locations across at least one electronic network by at least one resource provider.

19. The computer-implemented method of claim 13, wherein the dedicated capacity of at least one type of electronic resource includes at least one of computing capacity, storage capacity, bandwidth, load balancing, parallel data processing, or application environment management.

20. The computer-implemented method of claim 13, wherein the user is able to submit a request to update at least one of a set of members and a set of resources associated with the resource pool as a Web services request through an application programming interface (API) of a control plane of a resource provider.

21. A system for managing shared resources, comprising:
   at least one processor; and
   memory including instructions that, when executed by the at least one processor, cause the system to:
      provide a user with an amount of dedicated capacity of at least one type of electronic resource for at least a period of time;
      enable the user to create a resource pool including at least a portion of the amount of dedicated capacity and specify one or more members to be attached to the resource pool, each member able to access to at least a portion of the amount of dedicated capacity of the at least one type of electronic resource and any other resource included in the resource pool; and
      in response to receiving a request for access to at least a portion of the dedicated capacity for a leasing period of time from a member of the resource pool:
         validate the member as a member of the resource pool;
         determine an availability of the requested portion of the dedicated capacity during the requested leasing period; and
         ensure that the requested portion is in a clean state;
         ensure that at least one security control is in a determined state to ensure an amount of access to the requested portion; and
         grant the member with exclusive access to the requested portion of the dedicated capacity during the requested leasing period when the member is validated, the requested portion is in a clean state, the at least one security control is in a determined state, and the requested portion is available during the requested leasing period.

22. The system of claim 21, wherein the instructions when executed further cause the system to:
   cause control of the requested portion to revert back to the user after the requested leasing period.

23. The system of claim 21, further comprising:
   a plurality application programming interfaces (APIs) enabling the user to manage one or more aspects of the resource pool and enabling the members to submit requests with respect to the resource pool.

24. The system of claim 21, wherein members of the resource pool are determined through a third party group management system as specified by the user.

25. The system of claim 21, wherein the user is able to setup different sub-pools among resources of the resource pool, the members able to least one or more sub-pools according to one or more access rules for the sub-pool.

26. A non-transitory computer-readable storage medium including instructions for managing electronic resources, the instructions when executed by at least one processor of a computing device causing the computing device to:
    enable a first user to obtain an amount of dedicated capacity of each of a plurality of types of electronic resource for at least a period of time from an electronic resource provider;
    enable the first user to create a resource pool including the amount of dedicated capacity of each of the plurality of types of electronic resource;
    enable the first user to specify a set of configuration parameters for the plurality of types of electronic resource to create a computing environment for supporting at least one type of computing operation; and
    enable the first user to sub-let the resource pool to a specified user for a lease period,
    wherein the specified user is able to obtain dedicated access to the computing environment for the lease period without having to separately obtain access to the plurality of types of resource and specify the set of configuration parameters to create the computing environment, and
    wherein control over the computing environment reverts to the resource pool at an end of the lease period.

27. The non-transitory computer-readable storage medium of claim 26, wherein the instructions when executed further cause the computing system to:
    receive bids from at least two members of the resource pool; and
    select one of the bids for access to the portion of the resource pool according to at least one selection criterion.

28. The non-transitory computer-readable storage medium of claim 27, wherein the instructions when executed further cause the processor to:
    enable the user to assign priorities to one or more members of the resource pool, the priorities capable of being used in selecting bids for the portion of the resource pool.

29. The non-transitory computer-readable storage medium of claim 26, wherein the instructions when executed further cause the processor to:
    enable the user to add at least a portion of the resource pool to at least one additional resource pool; and
    enable the user to specify different members for each additional resource pool, each additional pool capable of sharing at least one resource with another additional pool.

* * * * *